United States Patent [19]

Wessel et al.

[11] 4,223,654
[45] Sep. 23, 1980

[54] METHOD AND APPARATUS FOR CONTROLLING THE OPERATION OF A DIESEL ENGINE

[75] Inventors: Wolf Wessel, Oberriexingen; Wilfried Sautter, Ditzingen; Gerhard Engel; Gerhard Stumpp, both of Stuttgart, all of Fed. Rep. of Germany

[73] Assignee: Robert Bosch GmbH, Stuttgart, Fed. Rep. of Germany

[21] Appl. No.: 847,365

[22] Filed: Oct. 31, 1977

[30] Foreign Application Priority Data

Nov. 2, 1976 [DE] Fed. Rep. of Germany ....... 2650247

[51] Int. Cl.² ............................................. F02M 51/06
[52] U.S. Cl. .................................... 123/358; 123/340
[58] Field of Search ................. 123/140 MC, 140 MP, 123/140 VS, 140 FP, 139 BG, 140 A, 140 FG, 32 EA, 32 AE, 32 J, 32 ER, 100, 123, 122 H

[56] References Cited

U.S. PATENT DOCUMENTS

| | | | |
|---|---|---|---|
| 2,925,066 | 2/1960 | Thorner | 123/140 FP |
| 3,817,226 | 6/1974 | Wakamatsu et al. | 123/140 MC |
| 3,841,283 | 10/1974 | Wood | 123/140 MC |
| 3,973,537 | 8/1976 | Williams et al. | 123/140 MC |
| 3,973,538 | 8/1976 | Williams et al. | 123/140 MC |
| 3,973,539 | 8/1976 | Jones et al. | 123/32 EA |
| 3,981,287 | 9/1976 | Williams et al. | 123/32 EA |

Primary Examiner—Gerald L. Brigance
Attorney, Agent, or Firm—Edwin E. Greigg

[57] ABSTRACT

A method and apparatus for controlling a Diesel engine by limiting the amount of fuel to be admitted to the engine in dependence on engine speed and on the air mass flow rate. The invention provides a primary set of stored data interrelating these variables. The primary data set is used to generate a set-point value for the position of a movable stop member which limits the mechanical travel of the fuel control rack in the fuel injection pump; the control rack is also subject to the action of a mechanical speed governor. Additional corrections of the maximum amount of fuel are made on the basis of air temperature and fuel temperature. Still further refinements include taking into account exhaust gas temperature and engine starting conditions. The final corrected set-point signal is then compared with the output from a position indicator which is attached to the stop member. A servo-controlled element corrects the position of the stop member until the error indications are minimized in a closed loop, feedback control circuit.

33 Claims, 14 Drawing Figures

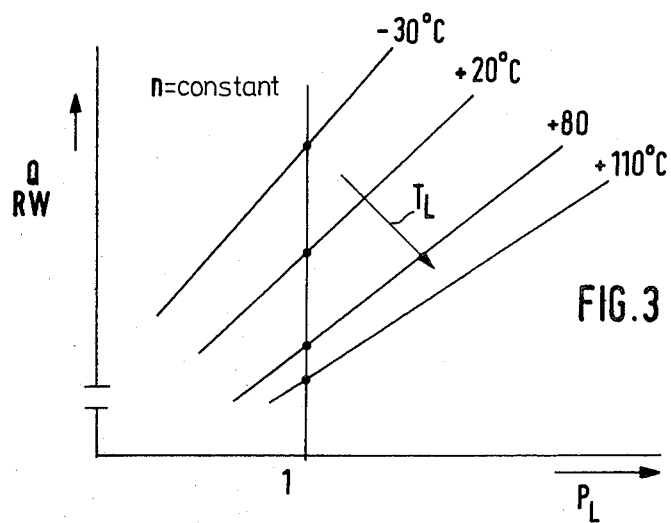
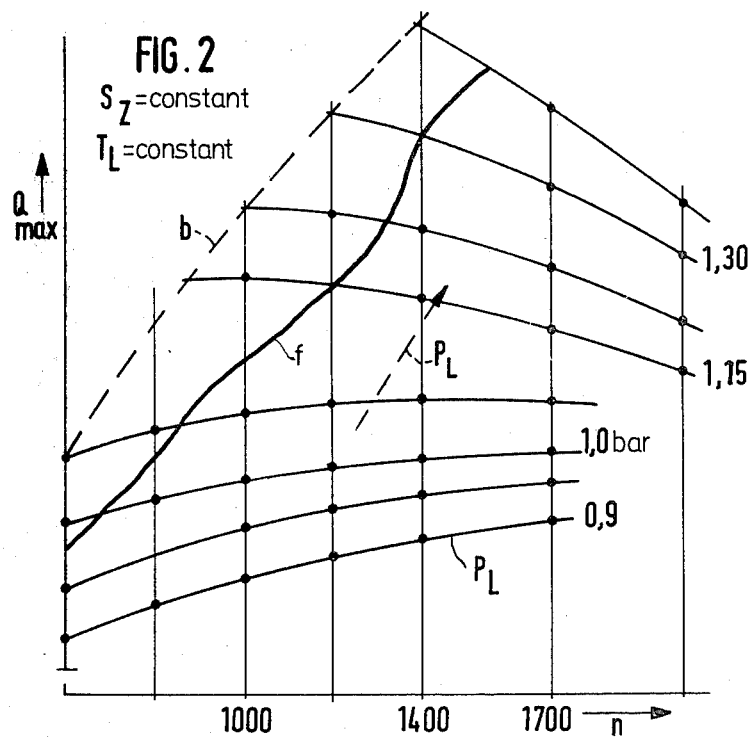

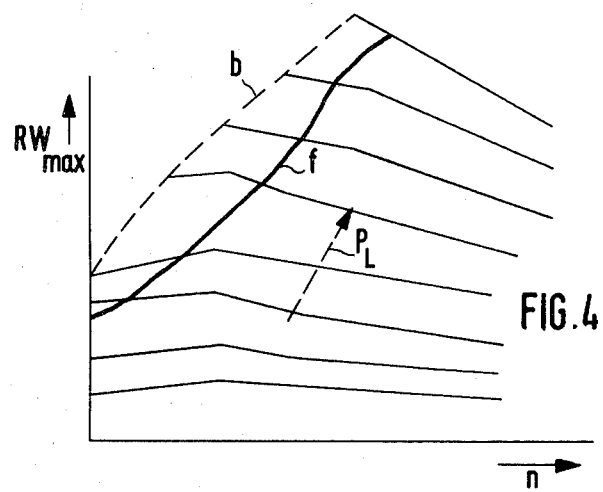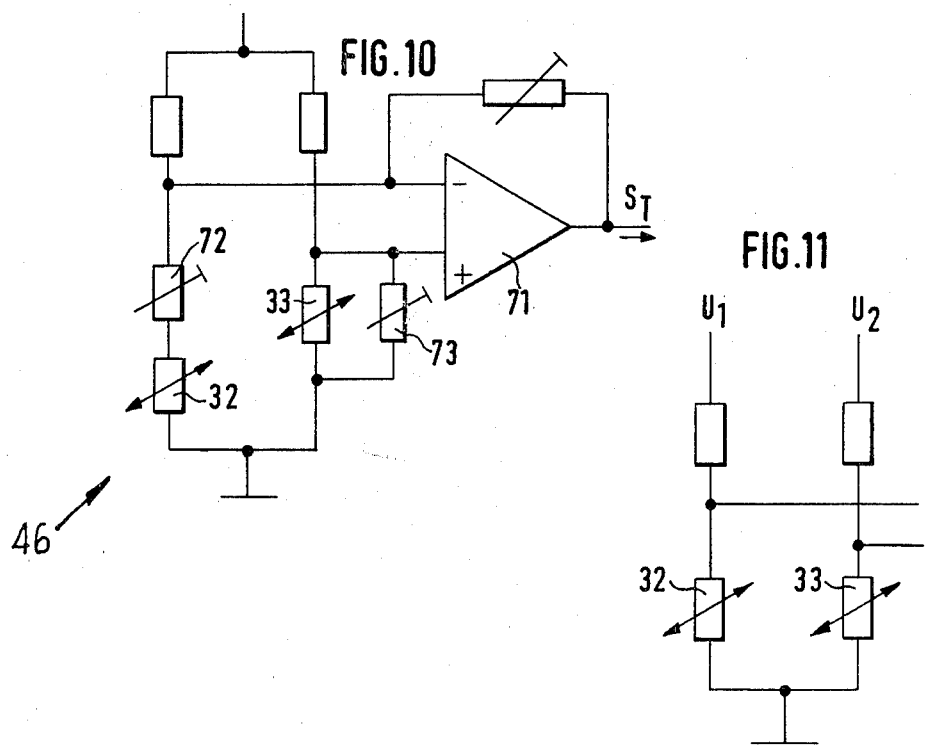

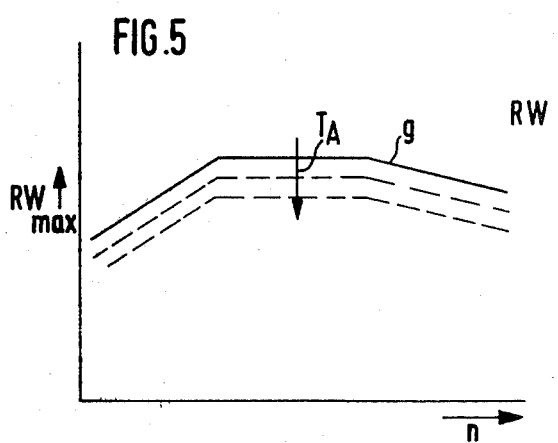
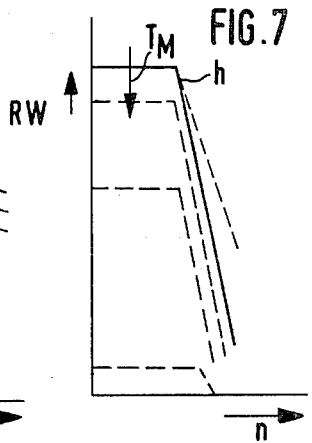
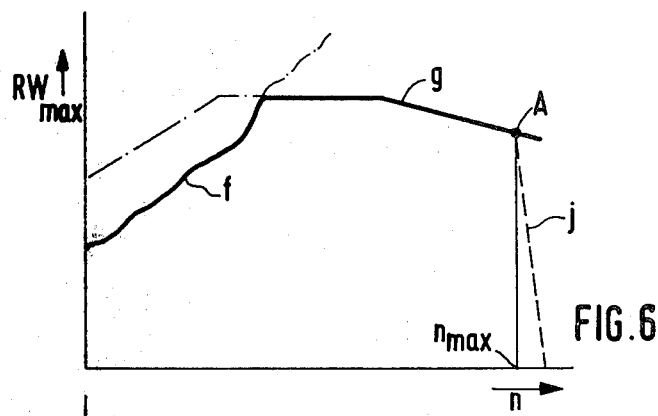
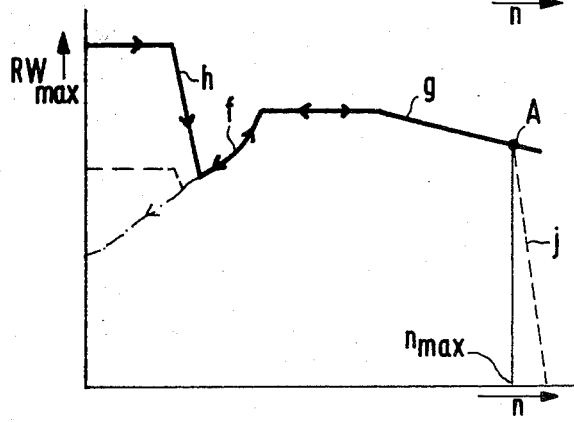

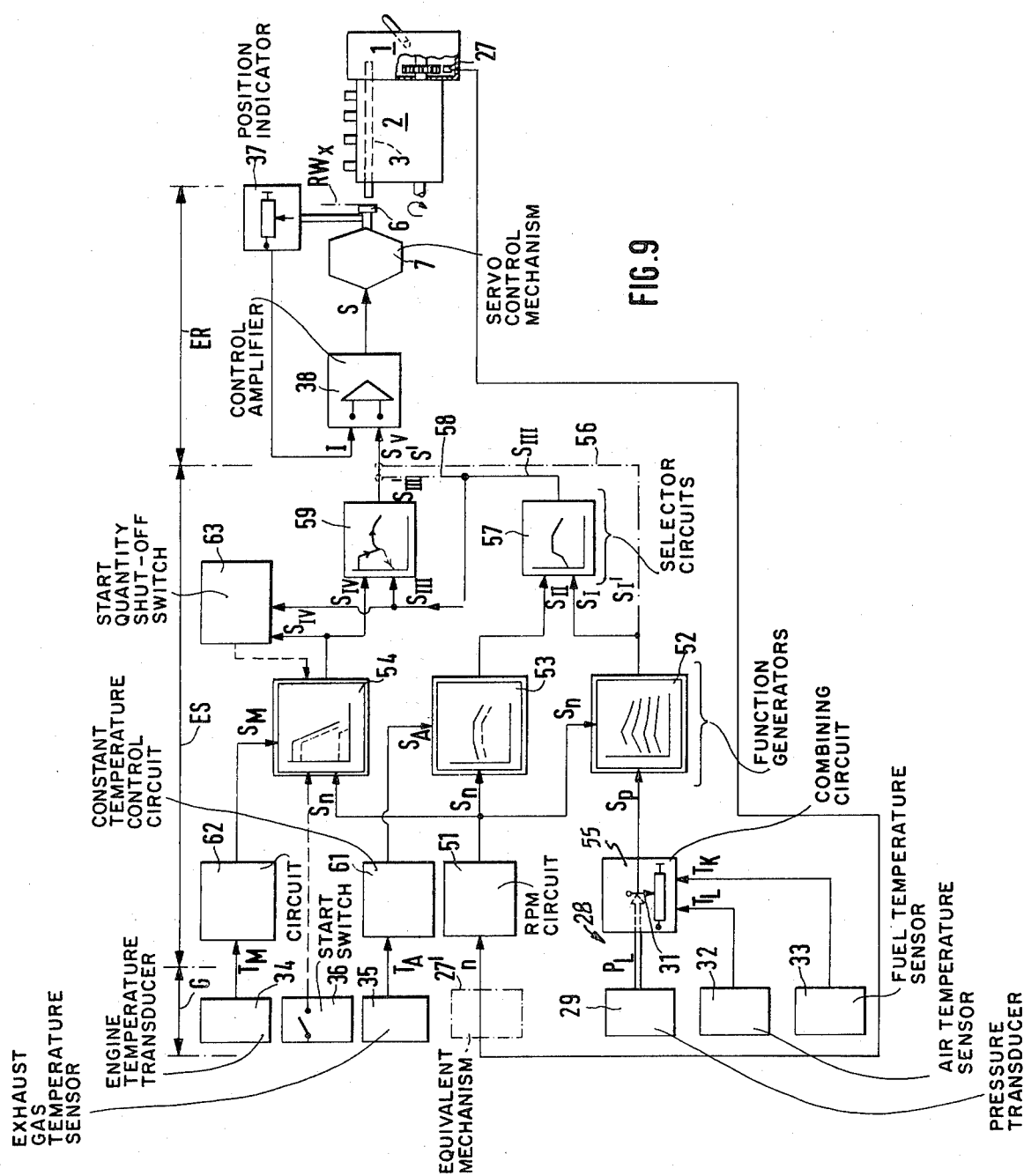

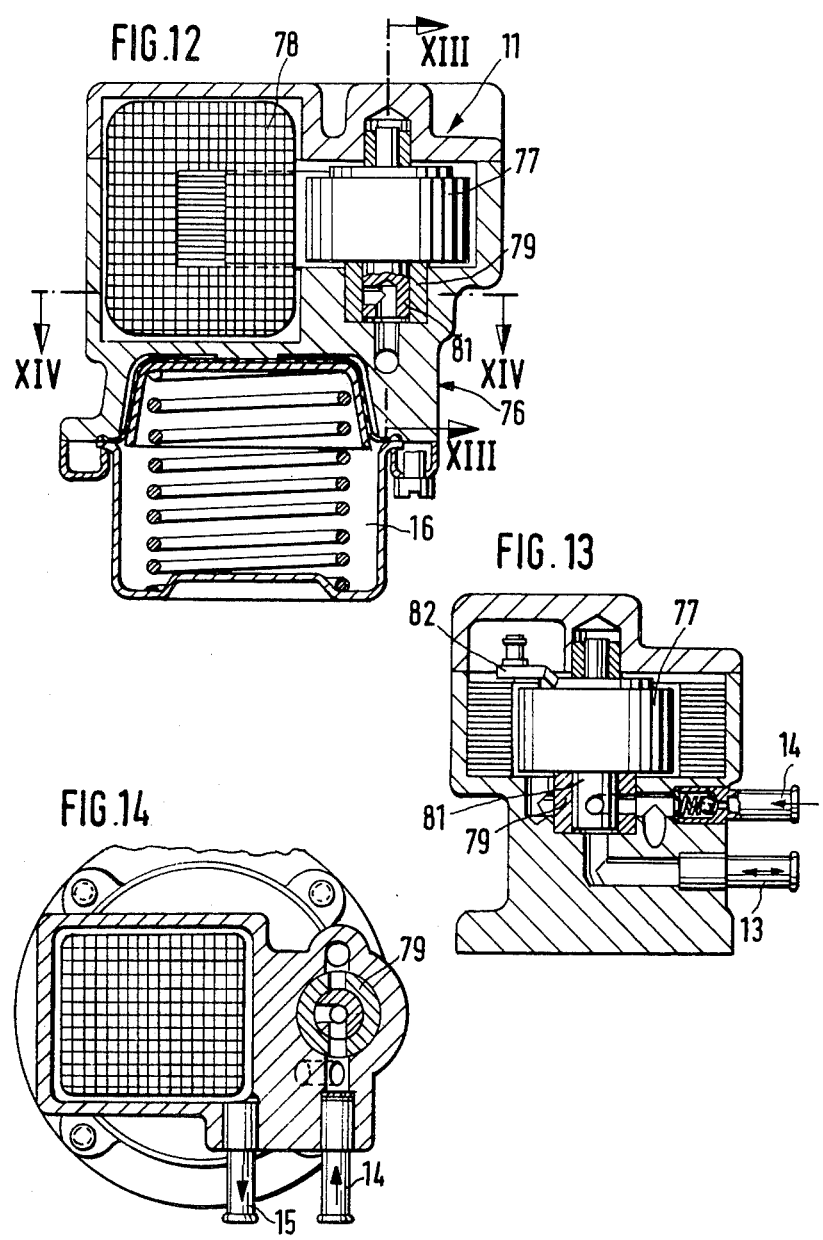

METHOD AND APPARATUS FOR CONTROLLING THE OPERATION OF A DIESEL ENGINE

BACKGROUND OF THE INVENTION

The invention relates to the control of the operation of a Diesel engine. More particularly, the invention relates to a method and an apparatus for limiting the maximum fuel quantity which is supplied to a Diesel engine, in particular a super-charged or turbo-charged Diesel engine. The method and apparatus of the invention still more particularly relates to a Diesel engine equipped with a fuel supply pump which supplies fuel as a function of engine variables including the engine speed and at least one other operational engine variable.

Known in the art is a Diesel engine control system which includes a speed governor and a control cam which the speed governor rotates as a function of engine speed. The control cam has a contour which serves to limit the maximum amount of fuel fed to the engine for each particular rpm and takes into account engine characteristics. The control curve of the cam is so designed as to reduce the amount of fuel for a full engine load when the engine speed is decreasing, which prevents an excessive amount of fuel to be supplied to the engine for decreasing rpm and thereby prevents exceeding the permissible smoke limit. This type of so-called negative adaptation is also used in super-charged engines to adapt the operation to account for the increasing air mass which accompanies increasing rpm and increasing induction tube turbo-charged pressure. However, these known methods for adapting the amount of fuel on the basis of rpm alone can take into account only a particular state of operation, for example only the full-load operation defined by a single full-load curve in which the maximum amount of fuel corresponding to a particular rpm and for example to the maximum air mass is limited. In this way, the engine is able to accelerate very rapidly but, when it is being accelerated from the partial-load domain in which the induction tube charging pressure has not yet reached the value corresponding to the instantaneous engine speed, the engine receives an excessive amount of fuel which causes the exhaust gases to exceed the visible smoke limit and may also overload the engine. For these reasons, the negative adaptation must be adjusted to correspond to reduced charging pressures which brings the disadvantage that the maximum power of the engine cannot be utilized.

In a particular example of the above-described known rpm-based governor, there is provided a second control element which operates on the base of the turbo-charged pressure and is a stop in the controller which adjusts the maximum amount of fuel determined by the control cam on the basis of the induction tube pressure. The appropriate positions for the control elements are determined for the prevailing induction tube charging pressure and the associated rpm for full-load operation, possibly considering other limiting values, in only a single operational state. A charge pressure dependent correction of this type has the disadvantage that the increase of the fuel quantity during engine acceleration almost always occurs with a time delay because the fuel is being supplied on the basis of induction tube charging pressure which only increases when the exhaust gas turbo-charger is subjected to increased exhaust gas pressure and exhaust gas temperature. This interdependency of fuel quantity, charging pressure and exhaust gas pressure has a disadvantageous overall affect on the acceleration characteristics of an engine equipped with an exhaust-driven turbo-charger and using the known control system. In particular, the known charging pressure dependent correction cannot maintain engine operation below the permissible visible smoke limit in all operational domains and especially is it unable to do so in the non-stationary domain, i.e., when the engine is being accelerated from a condition of relatively low load, for in that case, the maximum fuel quantity for a given smoke limit depends very highly on the instantaneous engine speed as well as on the instantaneous turbo-charging pressure. It has been determined in experiments that the measure of the air mass delivered to the engine must be obtained from the absolute induction tube charging pressure and from measurements of the vacuum occurring during acceleration.

Measurements on engines have shown that the curves which plot the maximum fuel quantity as a function of rpm for every domain of turbo-charging pressure have different slopes so that the distances between the curves are different for a constant pressure difference, as is illustrated for example in FIG. 2 and will be discussed in more detail below.

A dependency of this nature, in which the maximum fuel depends on the instantaneous engine speed and the instantaneous absolute turbo-charging pressure (or the air mass) cannot be accounted for with the known control systems which have as their goal an adaptation of the maximum fuel quantity on either engine speed or induction tube charging pressure. Even when the signal related to induction tube charging pressure is superimposed on the rpm-related control process, such as is provided by the known and above-described centrifugal speed controller, the fuel quantity supplied is greatly in error and forces the designer to compromise in the manner of controlling the engine and furthermore will lead to excessive smoking and poor acceleration in substantial domains of the engine operation. An added difficulty in the use of the known controllers and governors for Diesel engines is the fact that the full-load limitation of the fuel quantity on the basis of engine speed and induction tube charging pressure does not depend only on engine speed and charging pressure but also on other variables, for example the thermal and mechanical strength of the engine and these additional considerations may force the designer to provide expensive constructions which at best provide only an approximation to the exact limiting fuel quantity.

OBJECT AND SUMMARY OF THE INVENTION

It is thus a principal object of the invention to provide a method and an apparatus for controlling a Diesel engine in non-stationary operation in which the full available power of the engine is used and the most favorable acceleration factors are obtained. This principal object is attained according to the invention by providing that the full-load fuel quantity supplied to the engine is limited on the basis of the instantaneous engine speed and the instantaneous air mass flow rate.

Engine control processes which are based on a characteristic set of data, for example in the form of mechanically or electrically driven three-dimensional cams, have been used for many years in association with auto engines, i.e., externally ignited gasoline engines, where they serve for adjusting the amount of fuel as a function of accelerator position and other variables. Such known controllers however are not useable in the control of Diesel engines.

Characteristic operational data can also be used in electronic Diesel controllers but, until the present time, they have only been used to incorporate the known control characteristics, possibly while considering additional operational variables and they are constructed to serve as idling or terminal rpm controllers or rpm adjustment controllers which not only control a fixed full-load limitation but also determines partial-load curves or low rpm curves as determined by the mechanical controllers. These known controllers do not include a characteristic set of data related to full-load operation which limits only the maximum fuel quantity.

In a favorable feature of the invention, the method for obtaining the characteristic data related to the fuel quantity includes using a signal related to the instantaneous induction tube charging pressure as a measure of the air mass flow rate, while in suction engines the absolute induction tube vacuum is used as the controlling signal.

By normalizing the absolute pressure curves to a constant air temperature and by considering the prevailing air temperature it is possible to obtain a better measurement of the prevailing air mass flow rate. When the temperature of the air and the fuel are very different, it may also be advantageous to consider the fuel temperature as a correcting variable.

The method and apparatus of the invention further provides that the maximum permissible torque and/or other operational variables related to the maximum engine power are considered in generating a set of characteristic data used for fuel adaptation. Yet another set of data is generated to account for the excess fuel quantity required for engine starting. All these steps increase the optimum utilization of engine power for all operational states by controlling the operation of the fuel injection pump associated with the engine.

The invention provides apparatus which permits a rapid and simple measurement of the air mass flow rate as well as of the induction air temperature and the fuel temperature. A circuit which alternates between the smallest and largest value of these variables advantageously provides that only the set-point value permitting the maximum fuel quantity is used to set the servo-control member. The invention also provides an exhaust gas temperature sensor which makes the maximum fuel quantity additionally dependent on the exhaust gas temperature.

In many engines, it is not necessary to correct the control signal based on absolute charging pressure if the temperature changes of the induction tube air and the fuel are the same or at least follow a similar law. Therefore, when the air and fuel temperatures are equal, the invention advantageously provides that the control signal is either zero or has a fixed value.

The invention will be better understood as well as further objects and advantages thereof become more apparent from the ensuing detailed description of a preferred exemplary embodiment taken in conjunction with the drawing.

BRIEF DESCRIPTION OF THE DRAWING

FIG. 2 is a diagram illustrating the maximum fuel quantity as a function of induction tube pressure for a constant air temperature;

FIG. 3 is a diagram illustrating the maximum fuel quantity as a function of engine speed for various induction tube pressures;

FIGS. 4 to 8 are similar diagrams which are presented to be used in conjunction with the ensuing description of the method of the invention;

FIG. 9 is a block diagram illustrating in detail the electronic control system in FIG. 1;

FIG. 10 is a circuit diagram of a bridge circuit for coupling the air temperature and fuel temperature signals;

FIG. 11 is a diagram similar to that of FIG. 10 showing a different manner of calibrating the bridge circuit;

FIG. 12 is a sectional diagram of a solenoid valve and storage volume;

FIG. 13 is a sectional diagram along the line XIII—XIII in FIG. 12; and

FIG. 14 is a section along the line XIV—XIV in FIG. 12.

DETAILED DESCRIPTION OF THE PREFERRED EMBODIMENT

Figure 1:
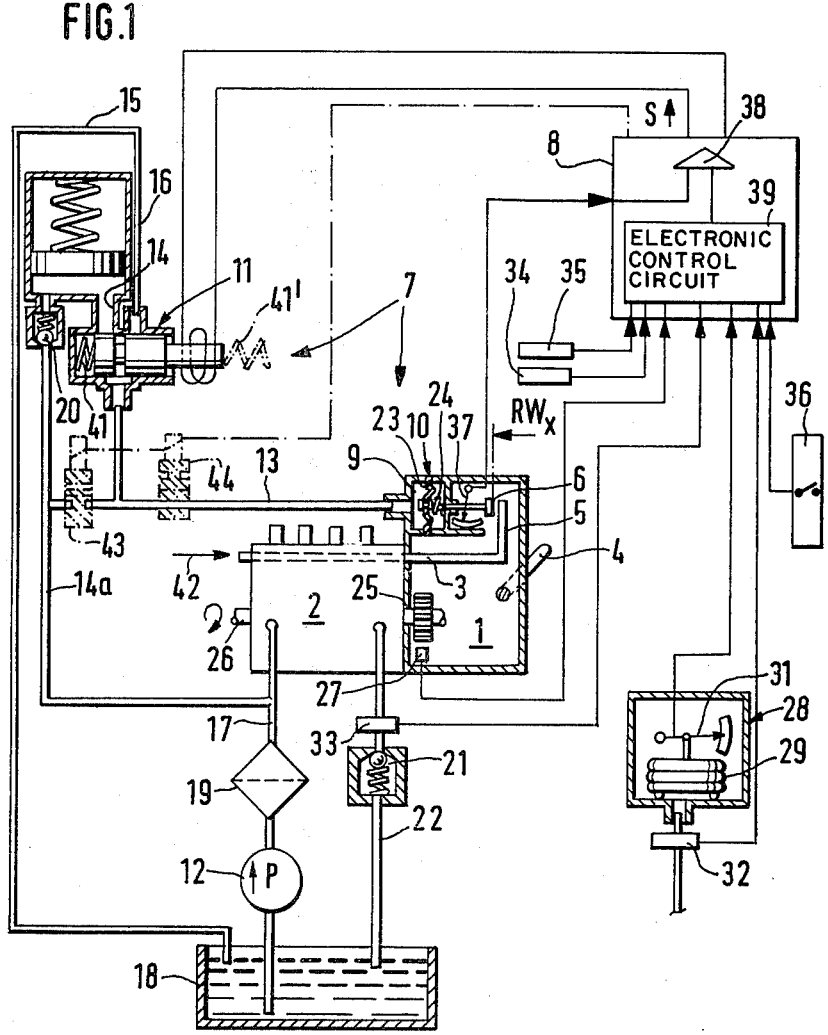
FIG. 1 is a simplified schematic diagram of an apparatus for carrying out the method according to the invention.

Turning now to FIG. 1, there will be seen a schematic illustration of a control system according to the invention including a fuel injection pump 2 whose basic operation is controlled by a mechanical speed governor 1 and which has a movable fuel rack 3 which is adjusted in known manner, not shown, by the speed governor 1 in dependence on the engine speed. The pump also includes an operating lever 4 for external adjustment of the amount of fuel to be injected by the pump 1. In the exemplary embodiment illustrated, the control rack 3 has a limiting stop arm 5 which cooperates with a stop 6 of a servo control member 7. The servo control member 7 is under the control of an electronic control circuit 8 to be described (FIG. 9) and has a hydraulic servo-motor 10 with a pressure chamber 9, coupled with a solenoid valve 11 which controls the flow of fuel, used as a control medium, in its passage from a low pressure pre-supply pump 12 to the pressure chamber 9. The magnetic valve 11 is a spool valve having an intermediate position in which, as shown in the illustration, a line 13 is blocked from communicating with either one of a supply line 14 and a return line 15. The use of a solenoid spool valve 11 is advantageous with respect to the commonly used pulse control valves in that it conserves control fluid. A surge chamber 16 is connected to the supply line 14 in order to compensate for pressure fluctuations and to permit rapid control processes. The surge chamber 16 is connected via a check valve 20 to a line 14a which is part of the supply line 14 and which branches off from the low pressure supply line 17 through which the low pressure pump 12 aspirates fuel from a tank 18 and delivers it through a filter 19 to the sump of the high pressure injection pump 2. The presence of the check valve 20 prevents a drainage of the storage chamber 16. Any excess fuel flows through a pressure maintenance or pressure control valve 21 via a line 22 to the tank 18. The servo control member which cooperates with the solenoid valve 11 and which, in this exemplary embodiment, is a hydraulic servo-motor 10, includes a flexible diaphragm 23 which defines the pressure chamber 9 into which is admitted the fuel flowing through the valve 11 via the line 13. The opposite side of the diaphragm is loaded by a return spring 24 which is supported by the housing of the servo motor 10. Fixedly attached to the diaphragm 23 is a stop member 6 whose position is determined by the solenoidal valve 11 as controlled by the electronic control circuit 8 and which represents the position of maximum fuel supply of the control rack 3 of the injection pump 2. The control circuit 8 sets the position of the stop 6 on the basis of a variety of engine variables, of which the engine speed "n" and the induction tube air pressure $P_L$ which is a measure of the amount of air fed to the engine play the most significant role in performing the function of limiting the maximum fuel quantity $Q_{max}$ in the present invention.

The engine speed "n" is sensed by a mechanism which includes a gear 25 mounted on the camshaft of the injection pump 2 which cooperates with an rpm sensor 27 that provides an rpm-related signal to the electronic control circuit 8. The absolute induction tube air pressure $P_L$ is transduced by an absolute pressure sensor 28 which feeds an appropriate control signal into the electronic control circuit 8.

The pressure sensor 28 includes substantially a pressure transducer 29 that includes a number of evacuated chambers and an electric position indicator 31 whose supply voltage can be adjusted as a function of the induction air temperature $T_L$ by a sensor 32 as will be explained in detail below in connection with FIG. 9. The electronic control circuit also receives signals from a fuel temperature sensor 33, an engine temperature sensor 34, an exhaust gas temperature sensor 35 as well as from an engine starting switch 36 and a position indicator 37 which provides a feedback signal to the control circuit 8 indicating the position $RW_x$ of the stop member 6.

The position indicator 37 is required in order to provide a feedback signal related to the actual position taken by the stop member 6. An open loop, forward control would not be of sufficient precision to set the servo member 7 in the desired manner. In order to perform the indicated feedback operation, the electronic control circuit 8 includes an electronic control amplifier, preferably having PID control characteristics, indicated in the circuit by the symbol 38 and described in detail below (FIG. 9). The control amplifier 38 generates a control signal S which actuates the solenoid valve 11 until the actual value indicated by the position sensor 37 is equal to the nominal, setpoint value generated by a circuit 39. The circuit 39 includes known components and is a portion of the overall control circuit 8 and is thus shown merely schematically by a box within the control circuit 8. An arrow 42 indicates the direction which the control rack 3 takes to shut off the engine.

In order to maintain orderly operation of the engine under the control of the mechanical controller 1 when the electronic feedback control system 8 fails, there is provided a return spring 41 associated with the armature of the solenoid valve 11 as shown in FIG. 1. It is the purpose of the spring 41 to cause the valve 11 to create a communication between the line 13 and the return line 15 when the power to the valve fails, thereby permitting the return spring 24 within the servo motor 10 to move the stop member 6 into a position which permits unhindered motion of the control rod 3 by the rpm governor 1. In this manner, the servo control mechanism 7 is effectively disabled and the rpm governor 1 is permitted to perform emergency operation of the engine. This type of connection also permits the provision of an automatic starting excess quantity because, when the engine is shut off, it is possible to move the control rod 3 into a position which supplies a fuel quantity in excess of that supplied at full engine load.

It may however be desirable to construct the system in such a way that when the current fails, the engine is automatically shut off. For this purpose, the return spring 41 would be inserted to act in the opposite direction as shown by the dashed lines 41'. In this construction, when a current failure occurs, the solenoid valve 11 creates a connection between the line 13 and thus between the pressure chamber 9 of the servo motor 10 with the supply line 14 and its associated storage volume 16 so that the fuel delivered by the pre-supply pump 12 moves the stop member 6 to the right, as seen in FIG. 1, thereby forcing the control rod 3 in the direction of engine stoppage as indicated by the arrow 42. This motion causes the injection pump 2 to cease delivering fuel, thereby shutting off the engine. This type of arrangement has the advantage that, when the engine has been shut off and the fuel pressure has decayed, the return spring 24 is then able to move the stop member back to the left into a position which prepares it to supply an excess starting quantity for renewed engine operation. In addition, however, this system provides a so-called and often desired push-start blockage because, when the ignition switch 36 is turned off and the solenoid valve 11 is not energized, the engine is unable to start even if the vehicle is being pushed or is rolling downhill because, as soon as the pre-supply pump 12 supplies fuel, the servo motor 10 is moved in the direction of engine stoppage and thereby immediately interrupts fuel delivery again.

An emergency engine shut-off during control system failure may also be initiated on the basis of other operational parameters, for example as shown in dash-dot lines, by a switching valve 43 which is connected to the line 13 which couples the solenoid valve to the servo motor 10 and which bypasses the solenoidal valve 11 and connects the servo motor 10 directly to the pre-supply pump 12 and/or to the storage volume 16.

If it is desired to maintain engine operation under the temporary control of the mechanical rpm governor 1 when the power fails or some other failure occurs in the electronic control circuit 8, then there may be provided, as indicated in dash-dot lines, a 2/2-path solenoid valve 44 which is held in the normally open position by the control circuit 8. When the power fails, this valve 44 would block the connection to the pressure chamber 9 of the servo motor 10 so that the stop member 6 is arrested in its last-assumed position and the motor can continue to be operated.

The controller 39, schematically drawn to be a part of the overall control mechanism 8, includes as a substantial element a function generator which provides a setpoint signal $S_I$ related to the full-load position of the fuel control rod on the basis of engine variables, for example the instantaneous rpm "n", the absolute induction tube pressure based on the signal from the sensor 28 and under consideration of other limits, for example the permissible smoke limit or the accelerating characteristics of the engine, as well as under consideration of the particular properties of the injection system which may be determined experimentally. The control system 39 and its operation will be discussed in detail in connection with FIG. 2.

The family of curves illustrated in FIG. 2 represents a data field which provides a maximum fuel quantity $Q_{max}$ as a function of the engine speed "n" and in which the various curves shown are based on different values of the parameter $P_L$ which refers to the absolute induction tube charging pressure. This pressure is a partial measure of the mass flow rate of air supplied to the engine. The curves shown in FIG. 2 are seen to have varying slope and curvature for different values of the parameter $P_L$ which indicates that the maximum permissible fuel quantity $Q_{max}$ is a strongly varying function of the engine speed "n". The family of curves shown in FIG. 2 ranges over pressures from 0.9 to 1.30 bar and thus represents a full-load data field which includes an entire family of characteristic curves rather than merely a single full-load curve as is customarily the case in known systems. From this family of curves the maximum full-load fuel quantity $Q_{max}$ may be obtained for any instantaneous rpm "n" and the associated instantaneous charging pressure $P_L$ within the induction tube of the engine. The curves shown in FIG. 2 were obtained from measurements on a turbo-charged Diesel engine, in each case for a charging pressure $P_L$ which was held constant by appropriate release of air in the supercharged region and by throttling within the vacuum domain so as to maintain a constant pressure for each measurement. Under these conditions, the full-load quantity was measured for a maximum exhaust gas turbidity (visible smoke limit, i.e., a number $S_z$=constant). The dashed line b, which limits the family of curves in the left portion of FIG. 2, represents a limiting curve for the particular turbo charger used, i.e., the maximum permissible fuel quantity associated with a particular rpm and the charging pressure then prevailing while maintaining the exhaust below the permissible smoke limit. This ideal curve b is not usually reached in practice because various factors, such as engine loading and others, such as the different characteristics of the turbo chargers and the response time of the engine during acceleration, do not normally permit the turbo-charged pressure to follow the instantaneous engine rpm so that, in order to remain below the permissible smoke limit, the fuel quantity must actually be reduced below the maximum ideal limit indicated by the line b, for example to an arbitrary curve f which is seen to constitute points of reduced maximum fuel quantity.

Inasmuch as the mass flow rate of air depends not only on the induction tube pressure but also on the air temperature, the curves in FIG. 2 have been drawn for a constant air temperature indicated by the notation $T_L$=constant, for example a temperature of 20° C. In actual practice, the electronic control circuit 39 receives a signal related to the air temperature $T_L$ and corrects the set-point value $S_I$ by multiplicative adjustment of the air pressure signal. This correction will be discussed in detail in connection with FIG. 9.

The curves in FIG. 3 illustrate the strong dependence of the maximum fuel quantity on the air temperature $T_L$. This diagram shows the fuel quantity Q or the associated control rod path RW as a function of induction tube pressure, with induction tube air temperature being the independent parameter. The curves are drawn for a constant engine speed "n" and range over an air temperature from −30° C. to +110° C. The intersection of these curves with the line indicating a constant pressure of 1 bar shows the high dependence of the fuel quantity Q (or the control rod position RW) on temperature. This dependence is accounted for by coupling the pressure signal with an air temperature signal and will be discussed below in connection with FIG. 9.

The maximum fuel quantity $Q_{max}$ is determined in actuality by the position RW of the control rod 3 which in turn is limited by the stop member 6 of the servo control mechanism 7. In order to set the position of the stop member 6, the electronic control circuit 39 includes a function generator which generates functions substantially as shown in FIG. 4 in which the maximum control position $RW_{max}$ which corresponds to the maximum fuel quantity $Q_{max}$ is plotted as a function of engine speed "n" with the absolute induction tube pressure $P_L$ being the independent parameter, similarly to the set of curves shown in FIG. 2. The curves of FIG. 4 are not identical to those in FIG. 2 because the fuel quantity delivered by the fuel injection pump is not a linear function of the engine speed "n" with constant control rod position RW.

For Diesel engines operating without supercharging, where the full-load quantity is obtained for high operating altitudes on the basis of the instantaneous induction tube pressure, the characteristic functions shown in FIGS. 2 and 4 are somewhat lower than those shown in the examples but may be used similarly by appropriate correction of the instantaneous induction tube pressure to a constant air pressure.

In the practical operation of the engine, other factors such as the thermal and mechanical strength of the engine may have to be taken into consideration in the generation of the full-load functions in addition to the permissible smoke limit and this additional correction is indicated in FIG. 5 by a characteristic curve "g" which refers to a known control process. The curve "g" relates to the maximum torque associated with a particular engine speed and/or other variables related to the maximum power of the engine together with which there is obtained the family of curves shown in FIG. 5. In this case, the second parameter is the exhaust gas temperature $T_A$. The functions illustrated in FIG. 5 serve as an additional control field for adjusting the set-point valve of the maximum fuel quantity or the control path $RW_{max}$. If the electronic control system 39 sets the stop member 6 on the basis of both characteristic data fields shown in FIGS. 4 and 5, then the controlling value of the full-load characteristic is the smallest of the two obtained from the characteristic curves of FIGS. 4 and 5. This selection results in the curve shown in FIG. 6 which is seen to be a composite of the acceleration curve "f" of FIG. 4 and the correction curve "g" of FIG. 5. The area below the composite curve "f"/"g" would contain similar curves related to different values of the parameter $P_L$ but these have been omitted for clarity.

FIG. 7 illustrates a further data field related to the provision of an excess fuel quantity for starting purposes. This data field would be superimposed on that of either FIG. 4 or 6 and is effective only in the preliminary speed ranges of the engine after start. The rpm-dependent curves labeled "h", which are known per se, are rpm-dependent starting curves indicated to be modified by the parameter $T_M$ related to engine temperature. The temperature correction is required to prevent an excess amount of fuel being supplied to a warm engine, thereby creating exhaust smoke.

If the maximum fuel quantity is thus derived from a combination of data fields, i.e., the data field of FIG. 7 related to engine starting, the adaptation field of FIG. 5 and the full-load basic characteristic functions of FIG. 4 (or those of FIG. 2) then the preliminary engine starting signal is taken to be the largest of the values from the data set of FIG. 7 which is then combined with the smallest value of the data fields of FIGS. 4 and 5 as shown in combined form in FIG. 6. This combined final curve is shown in FIG. 8 and is seen to be composed of sections of curves from curves "h", "r" and "g".

The point A shown in FIGS. 6 and 8 is the point identifying the maximum engine speed $n_{max}$ from which is drawn an engine shut-off curve "j". The engine shut-off is however not performed by the electronic control loop but by the basic speed governor 1. In order to provide safety shut-off at maximum engine speed, there may be included a further shut-off function in the servo control member 7, for example one becoming effective at a slightly higher than maximum engine speed.

The complete electronic control mechanism 8, including the controller 38 and the electronic control circuit 39 together with all the required transducers, the servo control member 7 and the injection pump 2 with its speed controller 1 are shown schematically in the composite diagram of FIG. 9. In order to simplify the representation, the stop member 6 of the servo control mechanism 7 is shown to act directly on the control rod 3 of the injection pump 2 but its function is exactly the same as previously described in relation to FIG. 1.

The diagram of FIG. 9 is divided into three portions, the leftmost portion defined by the arrow G being reserved for the various transducers while the middle section ES includes the electronic control circuit 39 and the right-most portion ER of the diagram includes the electronic controller which acts on the servo control member 7 and its stop member 6 and includes the control amplifier 38 as well as the position indicator 37 which generates a feedback signal indicating the position $RW_x$ of the stop member 6. The rpm transducer 27 is actually part of the controller 1 and is shown as an equivalent mechanism 27' shown in dash-dot lines. The rpm signal "n" is processed by an rpm circuit 51 which provides an rpm-dependent control signal $S_n$ which is fed to a full-load control function generator 52 and to an adaptation function generator 53 as well as to an engine starting function generator 54.

The full-load control path function generator 52 generates a set-point signal $S_I$ which depends on the rpm signal $S_n$ provided by the transducer 27 and on a further signal $S_p$ provided by the absolute pressure sensor 28. The pressure signal $S_p$ is generated by the path indicator 31 in proportion to the signal $p_L$ of the pressure transducer 29 in direct manner or, as actually shown, is corrected in a combining circuit 55 through correcting signals $T_L$ and $T_K$, respectively provided by the air temperature sensor 32 and the fuel temperature sensor 33. The combination of the signals $p_L$ and $T_L$ is performed in multiplicative fashion. This type of combination provides that the supply voltage of the electrical path indicator 31 is changed in dependence on the induction tube air temperature $T_L$. This type of multiplicative combination is substantially more accurate than a simple additive combination of signals which would be insufficient for the requirements of the control system.

The mass of fuel delivered by the injection pump is a function of temperature for constant pressure and volume. Accordingly, it is desirable to perform a correction for this change of mass by correcting the supply voltage of the electric path sensor 31 additionally on the basis of a signal from the fuel temperature sensor 33. Its control signal $T_K$ is connected to oppose the control signal $T_L$ from the air temperature sensor 32. This opposite connection accounts for the fact that, when the fuel and air have the same temperature, it is normally not required to correct the control signal $S_P$.

The multiplicative mixing of the two signals $T_L$ and $T_K$ with the signal $p_L$ may take place advantageously within the bridge circuit 46 which will be explained in greater detail in connection with FIGS. 10 and 11.

The full-load function generator 52 has available to it a set of data based on the air mass flow rate as described in FIG. 4. Thus if the position $RW_x$ of the control rod 3 of the injection pump 2 is to be set merely on the basis of this characteristic data field, then the set-point signal $S_I$ is a basic set-point signal $S_I'$ which, as is indicated by the connection 56, is fed directly to the control amplifier 38. When the actual value signal I as given by the position indicator 37 differs from the set-point $S_I'$, the control amplifier generates a control signal S which causes the servo member 7 to correct the actual position $RW_x$ of the stop member 6.

If, on the other hand, the full-load control data set of FIG. 4 is to be additionally corrected by the adaptation field of FIG. 5, then the set-point signal $S_I$ is compared with a secondary set-point signal $S_{II}$ as provided from an adaptation function generator 53 and this comparison is made in a selector circuit 57 which chooses the smallest of these two values. This smallest value, labeled $S_{III}'$, is then either fed directly to the input of the control amplifier 38 as shown by the dash-dot line 58, or else it is supplied as a set-point signal $S_{III}$ to a selector circuit 59 which chooses the largest of the set-point signal $S_{III}$ and a fourth set-point signal $S_{IV}$ from the starting corrector 54. The latter signal is generated only during an initial engine start. The larger of these values is labeled $S_V$ and is fed to the control amplifier 38.

The adaptive set of curves of FIG. 5 provided by the adapting function generator 53 can also be further corrected by an exhaust gas temperature signal $S_A$ which is generated on the basis of the signal $T_A$ from the exhaust gas temperature sensor 35 within a constant temperature control circuit 61. The signal $S_A$ changes the set-point signal $S_{II}$ from the function generator 53 in the sense of reducing the control path $RW_x$ of the control rod 3 as limited by the stop member 6. The constant temperature control circuit 61 can change the operational curve "g" within the adaptive field of FIG. 5 so as to hold the exhaust gas temperature $T_A$ constant and this temperature control may also be performed independently of rpm.

The set of functions generated by the generator 54 for the purpose of engine starting is corrected, as previously mentioned, on the basis of actual engine temperature. For this purpose, the signal $T_M$ from an engine temperature transducer 34 is transformed within a circuit 62 to a control signal $S_M$ which shifts the characteristic starting curve "h" of FIG. 7 in the direction of smaller fuel quantities or shorter control paths. If necessary, this signal can also be used to change the slope of the characteristic curve.

When the engine is first started, the switch 36 provides an "on" signal to the starting function generator 54 so that during an initial engine start, the control signal S from the control amplifier 38 is affected by the function generator 54 via its own control signal $S_{IV}$. Once the engine has achieved a first elevated speed, the start quantity shut-off switch 63 generates an "off" signal which shuts the excess fuel quantity off again. This switch 63 is a comparator which compares the signal $S_{IV}$ with the set-point signal $S_{III}$ from the selector circuit 57 and turns off the effect of the starting function generator 54 as soon as the travel of the control rod 3 based on the excess signal $S_{IV}$ is shorter than the position indicated by the selector circuit 57 which chooses the smallest of its two input values.

If the electronic control system does not contain an adaptation function generator 53, the smallest value selector circuit 57 may be dispensed with and the set-point signal $S_I$ is compared with the set-point signal $S_{IV}$ directly in the starting shut-off switch 63 in a manner not shown.

The multiplicative mixing of the signal $T_L$ related to the induction tube air temperature and the signal $T_K$ related to fuel temperature which is shown in simplified manner in FIG. 9 is actually performed by a bridge circuit 46. Each branch of the bridge includes a temperature sensor, respectively sensors 32 and 33, and the bridge circuit is connected to the input of a differential amplifier 71 which is embodied as a proportional amplifier having an adjustable amount of amplification. The sensors 32 and 33 are respectively connected to trimmer resistors 72 and 73 and are preferably NTC resistors. In order to balance the two halves of the bridge, they may also be connected to separate voltage supply sources $U_1$ and $U_2$ as shown in FIG. 11. The output signal $S_T$ from the differential amplifier 71 may be used to correct the control signal S of the control amplifier 38 by direct connection to the electronic control circuit 39. However, the most effective and most cost-effective manner of construction is, as indicated in FIG. 9, to use the output signal $S_T$ of the differential amplifier 71 to correct the supply voltage for the path indicator 31 contained within the absolute pressure sensor 28 and this is done in the mixing circuit 55.

In experiments and measurements on actual engines, it has been demonstrated that the pressure signal $P_L$ need not be corrected for air and fuel temperature changes if these two temperatures are the same. For this reason, the bridge circuit 46 in FIGS. 10 and 11 is so constructed that, when the temperatures of the inducted air and fuel are the same, then the differential voltage fed to the differential amplifier 71 will be zero. However, if a small amount of correction is desired, the bridge circuit may be adjusted to provide a small differential voltage even when the temperatures are equal.

The solenoid valve 11 indicated schematically in FIG. 1 is shown in more detailed manner in FIGS. 12-14 and is embodied here as an example as a rotating spool valve. As may be seen from the illustration of FIG. 12, the rotary spool valve 11 and the storage volume 16 are combined within a single unit 76 which permits a compact construction and favorable fuel conduits. The primary element within the valve 11 is a rotary slide 81 which is guided within a bushing 79 by the armature 77 of a rotary magnet 78. The rotary slide 81 constitutes a 3/2 path valve having an intermediate position which, as shown more clearly in FIG. 13, is able to connect the line 13 leading to the hydraulic servo motor 10 with the supply line 14 or else with the return line 15 (not shown). The rotary slide 81 is so constructed that, in its intermediate position, the line 13 leading to the pressure chamber 9 of the servo motor 10 is just closed off from the supply and return lines 14 and 15, but in advantageous manner so as to permit a very minimum amount of flow in both directions to prevent the creation of a dead zone. An arm 82 which is coupled to the armature 77 of the magnetic valve 11 in known manner engages a return spring which pulls the armature 77 and hence the rotary slide 81 to one of its terminal positions. Which position is chosen as the position assumed during a power failure is a matter of choice and subject to the requirements of each case. As previously discussed, it may be such as to connect the line 13 with the supply line 14 or with the return line 15.

The above-disclosed method and apparatus for controlling the limit of fuel quantity supplied to a Diesel engine on the basis of engine speed and air mass flow rate permit consideration of all of the most important engine variables which affect engine performance. On the basis of this method and the described apparatus the engine may be accelerated from the partial-load domain at any time and for any prevailing induction tube pressure while receiving the maximum permissible amount of fuel subject to the restraints of a particular exhaust gas coloration limit (smoke limit) or other limits related to the limitation of the power supplied by the engine.

The foregoing relates to preferred exemplary embodiments of the invention, it being understood that other embodiments and variants thereof are possible within the spirit and scope of the invention.

What is claimed and desired to be secured by Letters Patent of the United States is:

1. A method for controlling the full load fuel supply quantity to a Diesel engine, said engine being equipped with a mechanical speed governor, a fuel injection pump including a fuel quantity control rod, said speed governor serving to adjust the amount of fuel admitted to said engine by setting the position of the fuel quantity control rod in said fuel injection pump, and a control system including a full load stop, the position of which is set to limit the travel of said control rod, said method comprising the steps of:
    generating a first signal related to engine speed and a second signal related to the air mass flow rate;
    using said first and second signals to select information regarding the maximum amount of fuel from a primary data-set comprising a family of curves containing information regarding the maximum amount of fuel to be admitted to said engine by the fuel injection pump at full load for a given engine speed and for a given air mass flow rate into said engine; and
    applying said information to the control system to thereby set the position of said full load stop;
    whereby the full load operation of said engine is operated at optimum efficiency.

2. A method as defined by claim 1, wherein said second signal is derived from the charging pressure of a turbo charger in the induction tube of said engine, and wherein said family of curves of said primary data-set includes information as to the prevailing charging pressure in the induction tube at different constant values.

3. A method as defined by claim 1, wherein said second signal is determined by the prevailing atmospheric pressure and wherein said family of curves further in said primary data-set includes information regarding the absolute induction tube vacuum at a constant air pressure.

4. A method as defined by claim 1, wherein said step of deriving a characteristic operating data-set includes measuring the absolute air pressure in the induction tube of said engine and normalizing it to a constant air temperature.

5. A method as defined by claim 4, further comprising the step of generating a third signal related to air temperature, said second and third signals being combined for the purpose of said information.

6. A method as defined by claim 5, further comprising the step of generating a fourth signal related to fuel temperature and comparing said fourth signal to said third signal and combining it with the signal related to the air mass flow rate.

7. A method as defined by claim 1, wherein said primary data-set includes an adaptation curve limiting the information in said primary data-set to a particular set of values, said curve relating the maximum amount of fuel to the maximum engine torque and/or performance.

8. A method as defined by claim 7, wherein the information selected from said primary data-set is the smaller of the two values from said data-set or from said adaptation curve.

9. A method as defined in claim 7, wherein said primary data-set further includes a secondary data-set containing information as to an excess fuel quantity for engine starting related to engine temperature and applying wherein said method further includes the step of the information from said secondary data-set to said control mechanism to thereby adjust the position of said travel-limiting stop during engine starting but limiting the effect of such secondary information to the first run-up to speed of said engine.

10. A method as defined by claim 9, wherein during engine starting, and at each prevailing engine rpm, the limiting fuel quantity is that selected from the larger of the values from said secondary data-set and from said primary data-set which is combined with the smaller of the two values from said primary data-set and said adaptation curve.

11. An apparatus for controlling the full load fuel supply quantity to a Diesel engine, including: a mechanical speed governor; a fuel injection pump including a fuel quantity control rod, said governor serving to adjust the amount of fuel admitted to said engine by setting the position of the fuel quantity control rod in said fuel injection pump; a control system including a control mechanism and a full load stop, the position of which is set to limit the travel of said control rod; and an electronic feedback control circuit for actuating said control mechanism, said feedback control circuit including a full load control function generator for generating a set-point signal related to the full-load control position of said fuel control rod, said full load control function generator having a data-set comprising a family of curves containing stored information regarding the maximum amount of fuel to be admitted to said engine by the fuel injection pump at full load as a function of engine speed and air mass flow rate into said engine, a control amplifier, a position indicator for generating a position signal related to the position of said full load stop, said position signal being coupled to the input of said control amplifier and the set-point signal from said full load control function generator also being coupled to the input of said control amplifier, said control amplifier generating an output control signal which actuates said control mechanism, a transducer for sensing engine speed, and a transducer for sensing air mass flow rate, the output from said transducers being coupled to said full load control function generator to thereby select the stored information in said data-set;

whereby the position of said full load stop is changed in accordance with said set-point signal.

12. An apparatus as defined by claim 11, wherein said air mass flow rate transducer is an absolute pressure sensor disposed in the induction tube of said engine.

13. An apparatus as defined by claim 12, wherein said absolute pressure sensor includes evacuated diaphragm boxes and an electric position indicator and wherein said apparatus further comprises an air temperature sensor, the output of which controls the supply voltage of said position sensor in said absolute pressure transducer to thereby apply a multiplicative change of the output of said absolute pressure transducer.

14. An apparatus as defined by claim 13, further comprising a fuel temperature sensor for correcting the supply voltage of said electric position indicator and wherein the output of said fuel temperature sensor is connected to oppose the signal of said air temperature sensor.

15. An apparatus as defined by claim 13, further comprising a fuel temperature sensor and a bridge circuit, said bridge circuit receiving the signal from said air temperature sensor and from said fuel temperature sensor and being coupled to the input of an amplifier whose output is connected to the input of said primary function generator.

16. An apparatus as defined by claim 15, wherein the output signal from said amplifier corrects the supply voltage of the position indicator in said absolute pressure sensor.

17. An apparatus as defined by claim 15, wherein said air temperature sensor and said fuel temperature sensor are NTC resistors so dimensioned that when the air temperature equals the fuel temperature the bridge voltage applied to said amplifier is zero or a predetermined constant value.

18. An apparatus as defined in claim 15, further comprising a trimmer potentiometer for said air temperature sensor and a further trimmer potentiometer connected to said fuel temperature sensor.

19. An apparatus as defined by claim 15, further comprising a mixing circuit for receiving the output signal from said amplifier and for mixing it with the signal from said absolute pressure sensor.

20. An apparatus as defined by claim 15, wherein said amplifier is a proportional amplifier with adjustable gain.

21. An apparatus as defined by claim 11, wherein said electronic feedback control system includes a secondary function generator for generating a second set-point value related to the position of said stop as a function of engine speed and a further operational variable and further comprising a selecting circuit for selecting the smaller of the two outputs from said primary function generator and said secondary function generator and wherein the output from said smallest value selection circuit is applied to said control amplifier.

22. An apparatus as defined by claim 21, further comprising an exhaust gas temperature sensor whose signal is applied to said control amplifier.

23. An apparatus as defined by claim 22, further comprising a control circuit for maintaining a constant exhaust gas temperature.

24. An apparatus as defined by claim 11, further comprising an engine starting function generator which receives signals from said speed governor and from an engine starting switch, and which generates a starting signal and wherein said starting signal and the set-point signal from said primary function generator is fed to the input of a largest signal selecting circuit, the output of which is connected to said control amplifier.

25. An apparatus as defined by claim 24, wherein said engine starting function generator includes a comparator switch which compares the excess fuel signal from said engine starting function generator with the output signal of said primary function generator and shuts off the output from said engine starting function generator whenever the indicated position of said travel-limiting stop is less than the position described by said primary function generator.

26. An apparatus as defined by claim 25, further comprising an engine temperature sensor for adjusting the maximum value of said signal from said engine starting function generator on the basis of engine temperature.

27. An apparatus as defined by claim 25, further comprising an engine temperature sensor for changing the rapidity of shut-off of the excess fuel quantity determined by said engine starting function generator on the basis of engine temperature.

28. An apparatus as defined by claim 11, wherein said control mechanism includes a servo control element with an electrohydraulic servo motor having a pressure chamber and an electromagnetic control valve controlled by said control amplifier, for providing selective communication between a source of pressurized fuel and said pressure chamber.

29. An apparatus as defined by claim 28, wherein said source of pressurized fluid is the pre-supply pump of said fuel injection pump and said fluid is fuel.

30. An apparatus as defined by claim 29, further comprising a storage volume connected between said pre-supply pump and said electromagnetic valve and wherein said electromagnetic valve and said storage volume preferably forms a single constructional unit.

31. An apparatus as defined by claim 30, wherein said hydraulic servo motor is engaged by control fluid from said electromagnetic valve in the sense of increasing the amount of fuel deliverable by said pump and includes a return spring for motion in the opposite sense and wherein, when said electromagnetic valve is not energized, it assumes a position in which said pressure chamber of said servo motor is connected to said source of pressurized fluid.

32. An apparatus as defined by claim 31, further comprising a switching valve connected between said electromagnetic valve and said servo motor for bypassing said electromagnetic valve and connecting said servo motor to said pre-supply pump for emergency operation of said engine.

33. An apparatus as defined by claim 31, comprising a second electromagnetic valve connected between said electromagnetic valve and said servo motor whereby when said electronic feedback control system is operating, said second electromagnetic valve is held open whereas when said electronic feedback control system is inoperative, the communication between said electromagnetic valve and said servo motor is blocked.

* * * * *